A. C. Kasson,

Wood Auger.

No. 2,551. Reissued Apr. 9, 1867.

Witnesses:

Chas. A. Pettit

Salem. C. Kenrick

Inventors:

O. Knight Supp'd
for Munn & Co. atty
for A. C. Kasson & N. C. Gridley

AM. PHOTO-LITHO. CO. N.Y. (OSBORNE'S PROCESS)

United States Patent Office.

A. C. KASSON, OF MILWAUKEE, WISCONSIN, AND N. C. GRIDLEY, OF ST. LOUIS, MISSOURI, ASSIGNEES OF A. C. KASSON.

*Letters Patent No.* 61,208, *dated January* 15, 1867; *reissue No.* 2,551, *dated April* 9, 1867.

IMPROVEMENT IN AUGERS.

The Schedule referred to in these Letters Patent and making part of the same.

TO ALL WHOM IT MAY CONCERN:

Be it known that we, A. C. KASSON, of Milwaukee, Wisconsin, and N. C. GRIDLEY, of St. Louis, Missouri, are the proprietors of the Patent No. 61,208, granted to the said KASSON and GRIDLEY for Improvement in Augers, dated the 15th day of January, 1867; and we do hereby declare the following to be a full, clear, and exact description of the same, reference being had to the accompanying drawings, forming a part of this specification, and to the letters of reference marked thereon.

Similar letters of reference indicate like parts.

The invention consists in forming the twist of an auger or auger bit so that its front or working faces are concave, and its rear surfaces are convex, and the cutting lip of the auger receives its shape from the formation of the twist, and the outer edge of the twist is a cutting edge its whole length.

And to enable others skilled in the art to make and use the invention, we will proceed to describe its construction and operation.

Figure 1:
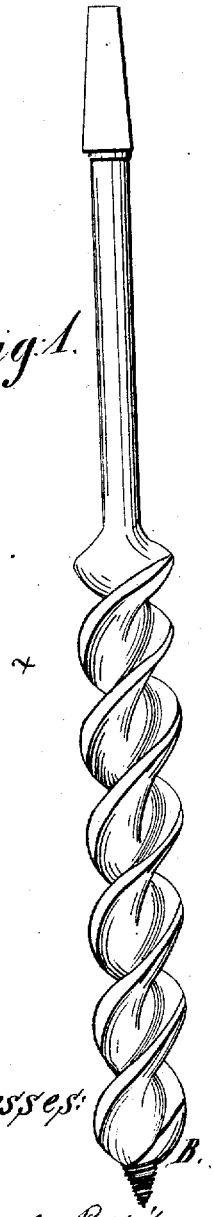
Figure 1 is an elevation of the auger as constructed for use.
Figure 2:
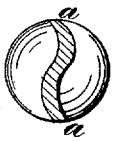
Figure 2 is a cross-section through the line *x x* of fig. 1.
Figure 3:
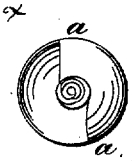
Figure 3 is an end view.
Figure 5:
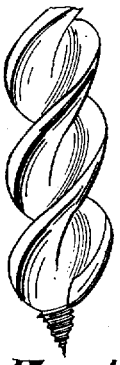
Figures 4 and 5 are illustrations from different points of view of a portion of a bit in which the twist is cut off coincident, or nearly so, with the axis of the bit.
Figure 4:
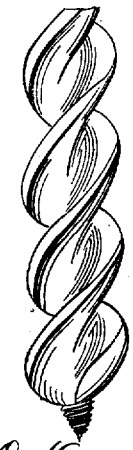
Figure 6:
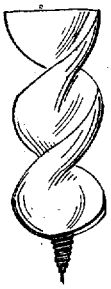
Figure 6 is an elevation of a portion of the auger, taken from a point directly in front of one of its cutting lips.

The twist of the auger is represented in fig. 2. It will be noticed that the edges of the twist, *a a*, are turned inward, forming a curve or nearly a half circle, which receives the chips or shavings, and from which they are discharged without being impeded by friction against the sides of the hole, thus relieving the auger, and preventing its clogging in the hole, and greatly lessening the labor. This outer edge of the twist is itself a cutting edge its whole length, and the hole is consequently made smooth and true. Thus a cutting lip is formed by the concavity of the twist, which throws the shavings or chips into the half circle or concave twist without any extra or special lip, or curve of the lip of the cutter. The form of the curve from the outer edge of the twist to the centre, or near the centre, gives shape and form to the cutting lip B of the auger. The lip B has the half circle or curved shape of the twist, which follows the concavity of the twist from the screw or cutting point to the periphery, and inclines to the axis of the auger, as will appear from an examination of figs. 4 and 5, which are illustrations from different points of view of an auger in which the twist is cut off in a plane coincident, or nearly so, with the axis of the auger, fig. 4 being a view in nearly the line of the plane of the section, and fig. 5 showing its appearance when partially rotated; showing that the cutter is made from the concavity of the twist, and that it inclines from the screw to the periphery. As the twist has the same shape its whole length, it will be seen that any portion of the twist will form the cutting lip as well as the lower portion, by cutting off the twist at any given point, in a plane coincident, or nearly so, with the axis of the auger and sharpening its edges, and consequently, should the lip or screw be broken, another lip and another screw can be formed, and the auger be rendered as efficient as ever, instead of being rendered entirely useless, as would be the case with common augers. The cutting lip commences at the screw, and is, in fact, nothing more than the lower end or termination of the twist brought to an edge, the cutting edge of the auger extending from the screw to the top of the twist. This form of the twist makes a much stronger and stiffer auger than the old kind; the turning in of the edge of the twist forms a concave surface, and on the opposite a convex, which acts as a rib, and which greatly strengthens the auger. To the cutting lip spurs, as in common use, may be added. We are aware that tapered boring tools have been made with concave working faces and convex backs, and do not claim such tapering tools.

Having thus described the invention, what we claim as new, and desire to secure by Letters Patent, is—

1. An auger having a twist whose front or working faces are concave, and whose rear surfaces are convex, substantially as represented in fig. 2.

2. An auger constructed substantially as herein shown and described, which permits the formation of cutting lips at any point in its length, by simply cutting off the twist at any given point, in a plane coincident, or nearly so, with the axis of the auger, and sharpening its edges.

3. In an auger constructed as described, we claim the cutting lips B, formed with sharpened edges following the concavity of the twist, from the screw or centre-point to the periphery, and inclined to the axis of the auger, substantially as shown and described.

4. The combination of the twist, the cutting lips, and the cutting edges of the twist, substantially as herein shown and described.

A. C. KASSON,
N. C. GRIDLEY.

Witnesses:
F. W. NOYES,
GEORGE SCHROEDER.